United States Patent [19]

Stine et al.

[11] 4,268,416

[45] May 19, 1981

[54] GASEOUS PASSIVATION OF METAL CONTAMINANTS ON CRACKING CATALYST

[75] Inventors: Laurence O. Stine, Western Springs; Steven I. Richter, Arlington Heights, both of Ill.

[73] Assignee: UOP Inc., Des Plaines, Ill.

[21] Appl. No.: 79,769

[22] Filed: Sep. 28, 1979

Related U.S. Application Data

[63] Continuation-in-part of Ser. No. 48,956, Jun. 15, 1979, abandoned.

[51] Int. Cl.³ .................. B01J 29/38; B01J 21/20; C10G 11/05; C10G 11/04
[52] U.S. Cl. ..................... 252/416; 208/52 CT; 208/113; 208/120; 252/411 R; 252/417; 252/420
[58] Field of Search ........... 252/416, 417, 420, 411 R; 208/52 CT, 113, 120

[56] References Cited

U.S. PATENT DOCUMENTS

| 2,575,258 | 11/1951 | Corneil et al. | 252/417 |
| 2,755,231 | 7/1956 | Blanding et al. | 252/420 |
| 3,433,732 | 3/1969 | Leaman | 252/420 |
| 4,176,083 | 11/1979 | McGovern et al. | 252/411 R |

OTHER PUBLICATIONS

Oil & Gas Journal–May 15, 1972–pp. 112–122, "Deposited Metals Poison F.C.C. Catalysts–R. N. Cimbalo et al.

*Primary Examiner*—P. E. Konopka
*Attorney, Agent, or Firm*—James R. Hoatson, Jr.; Louis A. Morris; William H. Page, II

[57] ABSTRACT

A contaminating metal on a cracking catalyst used for the cracking of hydrocarbons is passivated by contacting the catalyst at reduction conditions with a reducing gas such as hydrogen that has been saturated with water at ambient conditions.

7 Claims, No Drawings

GASEOUS PASSIVATION OF METAL CONTAMINANTS ON CRACKING CATALYST

CROSS-REFERENCE TO RELATED APPLICATION

This application is a continuation-in-part of our prior, copending application Ser. No. 48,956 filed June 15, 1979 and now abandoned. All of the teachings of this prior application are incorporated herein by reference thereto.

BACKGROUND OF THE INVENTION

1. Field of the Invention

The field of art to which the claimed invention pertains is the catalytic cracking of hydrocarbons. More specifically, the claimed invention relates to a process for the passivation of contaminating metals on a fluidized cracking catalyst.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking process for the conversion of relatively high-boiling hydrocarbons to lighter hydrocarbons boiling in the heating oil and gasoline (or lighter) range. The hydrocarbon feed is contacted in one or more reaction zones with the particulate cracking catalyst maintained in a fluidized state under conditions suitable for the conversion of hydrocarbons.

A common problem in the fluid catalytic cracking process is the gradual deterioration of the catalyst due to the deposition on the catalyst of metal contaminants contained in the hydrocarbon feed, such as nickel, vanadium and iron. These deposited metal contaminants increase the production of hydrogen, light gases and coke at the expense of the highly desired gasoline.

The art teaches many techniques for dealing with these undesirable metal contaminants. Such techniques can be divided into two broad catagories, one being the passivation of the contaminants by reacting the catalyst with a passivating agent, which forms relatively innocuous complexes with the metal contaminants, and the other being the physical removal of the contaminants from the catalyst. Examples of techniques falling within the former category are as taught or claimed in U.S. Patent Publication Nos. 2,758,097 (reaction with phosphorous pentoxide); 3,711,422 (reaction with an antimony compound); and 4,025,458 (reaction with a chemical complex containing antimony). Examples of techniques falling within the latter category are as taught or claimed in U.S. Patent Publication Nos. 3,252,918; 3,324,044; 4,013,546; and 4,014,815.

There is also art that teaches reduction and sulfiding treatment of non-fluidized moving catalyst beds to temper the activity of certain desired metals, such as those contained in Group VIII of the Periodic Table, intentionally added to the catalyst. The processes in which these moving catalyst beds are used include processes such as hydrocracking and reforming. U.S. Pat. No. 3,838,038 is an example of such art teaching reduction and sulfiding of a non-fluidized catalyst containing certain desired metals.

We have found a process for passivating an undesired metal contaminant on a fluid cracking catalyst by reaction with a reducing gas.

SUMMARY OF THE INVENTION

It is, accordingly, a broad objective of our invention to achieve passivation of undesired metal contaminants on a fluid catalytic cracking catalyst.

In brief summary, our invention is a process for passivating a metal on a fluidized cracking catalyst which has been contaminated with that metal due to the use of the catalyst in a fluidized cracking system not involving the introduction of hydrogen. The catalyst is cycled between a cracking zone, in which said catalyst is contacted at an elevated temperature with a hydrocarbon feedstock containing the metal contaminant which deposits on the catalyst, and a regeneration zone, in which carbon is oxidized and thereby removed from the catalyst. The metal is included in the group consisting of nickel, vanadium and iron. The process comprises contacting the catalyst at reduction reaction conditions with a reducing gas that has been saturated with water at ambient conditions so as to effect a reduction reaction with said metal.

Other objectives and embodiments of our invention encompass details about catalyst composition, flow schemes, reduction reaction conditions and reducing gas composition, all of which are hereinafter disclosed in the following discussion of each of the facets of our invention.

DESCRIPTION OF THE INVENTION

Catalysts which can be used in the process of this invention include those known to the art as fluidized catalytic cracking catalysts. Specifically, the high activity aluminosilicate or zeolite-containing catalysts can be used and are preferred because of their higher resistance to the deactivating effects of high temperatures, exposure to steam, and exposure to metals contained in the feedstock. The aluminosilicate or zeolite will be dispersed in an amorphous alumina or silica-alumina matrix. The well-known amorphous catalysts such as alumina or silica-alumina may also be used. The catalysts may or may not be promoted by having incorporated therein, or being used in conjunction with, certain metals or metallic compounds known to enhance the combustion of CO to $CO_2$ in the FCC regeneration zone.

Charge stocks used in the catalytic cracking process are mentioned here because contaminant metals such as nickel, iron, copper and vanadium found in the charge stock usually influence the regeneration operation, catalyst selectivity, catalyst activity and the fresh catalyst makeup rate required to maintain a constant activity. Metals contained in the feed are deposited on the catalyst and not only change its selectivity in the direction of less gasoline and more coke and light gas in a given reaction system but tend to deactivate the catalyst.

In a typical FCC process flow, finely divided regenerated catalyst leaves the regeneration zone at a certain temperature and contacts a feedstock in a lower portion of a reaction riser zone. While the resulting mixture passes up through the riser, conversion of the feed to lighter products and to coke deposited on the catalyst occurs. The effluent from the riser is discharged into a disengaging space where additional conversion can take place. The hydrogen vapors, containing entrained catalyst, are then passed through one or more cyclone separation means to separate any spent catalyst from the hydrocarbon vapor stream. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reaction riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, countercurrently contacts the spent catalyst purging adsorbed and interstitial hydrocarbons from the catalyst. The spent catalyst containing coke leaves the stripping zone and passes into a regeneration zone, where, in the presence of fresh regeneration gas, combustion of coke produces regenerated catalyst and flue gas containing carbon monoxide, carbon dioxide, water, nitrogen and perhaps a small quantity of oxygen. The regeneration zone may be of a conventional type or one designed for complete combustion of CO to $CO_2$ with catalyst which may or may not be promoted as aforementioned. Usually the fresh regeneration gas is air, but it could be air either enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam. Regenerated catalyst which was separated from the flue gas is returned to the lower portion of the regeneration zone which is maintained as a dense bed of spent catalyst. Regenerated catalyst leaves this dense bed and, as previously mentioned, contacts the feedstock in a reaction zone.

Minute amounts of the contaminating metals found in the charge stock, when deposited on the fluid cracking catalyst, are highly detrimental to the efficiency of the catalyst. Such catalyst so contaminated, even with an extremely small amount of metal contaminants, exhibits decreased activity and excessive hydrogen and coke formation during cracking reactions. Since a large portion of the circulating catalyst remains in the cracking system over an extended period of time, the amount of metal contaminants will gradually build up to the point where further use of the catalyst will be uneconomical.

We have found that contacting the fluid cracking catalyst, at reduction reaction conditions with a reducing gas that has been saturated with water will effect a substantial lessening in the formation of hydrogen and coke in the catalytic reactor. Although carbon monoxide may be used, the preferred reducing gas is hydrogen. The preferred reduction reactions conditions are a temperature of from about 1100° F. to about 1350° F. and a pressure of from about atmospheric to about 35 psig.

Without being limited by any theory, it is postulated that the acidity of the +5 oxidation state of vanadium is the cause of this contaminant's activity in promoting undesirable reactions such as excessive hydrogen and coke production. Upon reduction, the basic, lower oxidation states of vanadium which are formed are much less active if not inactive. When the nickel is reduced to the zero oxidation state, on the other hand, enhanced agglomeration may serve to reduce its deleterious effects given sufficient treatment time.

It is also postulated, at least when hydrogen comprises the reducing gas, that an amount of hydrogen will become H+ ions on the catalyst during the reduction. The H+ acts to minimize the extent of hydrocarbon polymerization in the reactor thereby substantially reducing the carbon formation that is associated with such polymerization.

It is further postulated that water of saturation in the reducing gas enhances interaction of the contaminating metal with the amorphous catalyst or amorphous catalyst matrix. This interaction is referred to a "spinel formation" which may be exemplified by the reaction of nickel with alumina to form nickel aluminate ($NiAl_2O_4$). The spinel formation tends to be inactive with regard to the promotion of undesirable reactions. Water of saturation may be introduced into the reducing gas through liquid water at ambient temperature and pressure, i.e. about 70° F. and 14.7 psig or elevated temperatures and/or pressure, i.e. up to 200° F. and 35 psig.

It is preferred that the passivation of the fluid cracking catalyst occur in a passivation zone to which catalyst is cycled from the regeneration zone and from which catalyst is cycled to the cracking zone.

The following non-limiting example is illustrative of the process of our invention.

EXAMPLE

The data obtained for this example illustrates the effect of the practice of our invention with a fluidized cracking catalyst contaminated with nickel and/or vanadium. The primary measure of the effectiveness of our invention is its influence on the dehydrogenation capability of the catalyst tested. It is desired to reduce this capability, or, in other words, to passivate the catalyst. The dehydrogenation capability of the catalyst, both with and without treatment by the process of our invention, was determined by measuring the extent the catalyst was able to catalyze the conversion of propane to propene.

The measurement of the ability of the catalyst to effect the conversion of propane to propene was carried out with a quartz, pulsed downflow microreactor. The quantity of catalyst tested in each case was 0.5 grams. One half ml of propane at ambient conditions was passed through the reactor with each pulse. The reactor temperature was maintained at 1100° F.

The catalysts to be tested were obtained by impregnating a commercial equilibrium fluidized cracking catalyst to various levels of Ni and/or V contamination using an aqueous solution of $Ni(NO_3)_2$ and/or $NH_4VO_3$, a toluene solution of Ni (naphthenate)$_2$ or an aqueous solution of V phthalocyanine tetrasulfonate. The catalysts were pretreated in some instances with air and in some instances with hydrogen or air followed by hydrogen and in some instances with air followed by hydrogen that was saturated with water at ambient conditions to simulate treatment in accordance with this invention. The catalyst was then subjected to pulses of propane as discussed hereinabove and the reactor effluent was analyzed for propene production.

In the following data, test runs are grouped according to catalyst loadings, with all runs following a run on a fresh loading of catalyst being run on that same loading:

TABLE

Catalyst - C.E. Impregnated/Ni(NO$_3$)$_2$ + NH$_4$VO$_3$

| ppm | | | | |
|---|---|---|---|---|
| Ni | V | Pretreatment | Loading | % Propene |
| 1550 | 4500 | Air, 1300° F., 30 min. | Fresh | 11.1 |
| | | Air, 1300° F., 30 min., then H$_2$, 1300° F., 15 min. | Used | 2.88 |
| | | Air, 1300° F., 30 min. | Used | 11.9 |
| | | Air, 1300° F., 30 min., then H$_2$ + H$_2$O, 1300° F., 15 min. | Used | 1.48 |
| | | Air, 1300° F., 15 min. | Used | 10.2 |
| | | Air, 1300° F., 30 min. | Fresh | 11.8 |
| | | Air, 1300° F., 30 min., then H$_2$ + H$_2$O, 1300° F., 5 min. | Used | 1.75 |
| | | Air, 1300° F., 15 min. | Used | 10.6 |
| | | Air, 1300° F., 30 min., then H$_2$, 1300° F., 5 min. | Used | 2.97 |

It is clear from the foregoing data that treatment of a metal contaminated FCC catalyst by the process of this invention will reduce the undesirable dehydrogenation activity of the catalyst, i.e. where pretreatment included the presence of water, the lowest propene production was obtained. Our invention is therefore an effective means for passivating a metal on a fluidized cracking catalyst that has been contaminated with that metal.

We claim as our invention:

1. A process for passivating a metal on a crystalline zeolite fluidized cracking catalyst which has been contaminated with said metal due to the use of said catalyst in fluidized cracking system not involving the introduction of hydrogen and wherein said catalyst is cycled between a cracking zone, in which said catalyst is contacted at an elevated temperature with a hydrocarbon feedstock containing said metal contaminant which deposits on said catalyst, and a regeneration zone, in which carbon is oxidized and thereby removed from said catalyst, said metal being included in the group comprising nickel, vanadium or iron, which process comprises contacting said catalyst at reduction reaction conditions with reducing gas consisting essentially of hydrogen that has been saturated prior to its contact with said catalyst with water in a liquid phase at a temperature of about 70° F. to about 200° F. so as to effect a reduction reaction with said metal and thereby reduce the quantity of coke generated in the cracking zone.

2. A process in accordance with claim 1 wherein said saturating with water is effected at elevated pressure.

3. The process of claim 2 wherein said elevated pressure may be up to about 35 psig.

4. A process in accordance with claim 1 wherein said catalyst comprises alumina or silica-alumina.

5. A process in accordance with claim 1 wherein said catalyst comprises crystalline aluminosilicate dispersed in an alumina or silica-alumina matrix.

6. A process in accordance with claim 1 wherein said contacting of said catalyst with said reducing gas consisting essentially of hydrogen occurs in a passivation zone with said catalyst being cycled from said regeneration zone to said passivation zone and from said passivation zone to said cracking zone.

7. A process in accordance with claim 1 wherein said reduction reaction conditions comprise a temperature of from about 1100° F. to about 1350° F. and a pressure of from about atmospheric to about 35 psig.

* * * * *